United States Patent [19]

Krutak et al.

[11] Patent Number: 5,336,714
[45] Date of Patent: Aug. 9, 1994

[54] WATER-DISSIPATABLE POLYESTERS AND AMIDES CONTAINING NEAR INFRARED FLUORESCENT COMPOUNDS COPOLYMERIZED THEREIN

[75] Inventors: James J. Krutak; Michael R. Cushman; William W. Parham; Clarence A. Coates; Max A. Weaver, all of Kingsport, Tenn.; Gabor Patonay, Stone Mountain, Ga.

[73] Assignee: Eastman Chemical Company, Kingsport, Tenn.

[21] Appl. No.: 175,447

[22] Filed: Dec. 30, 1993

Related U.S. Application Data

[62] Division of Ser. No. 19,535, Feb. 18, 1993, Pat. No. 5,292,855.

[51] Int. Cl.$^5$ .................................... C08K 3/20
[52] U.S. Cl. .................... 524/608; 528/272; 528/288; 528/289; 528/290; 528/291; 528/292; 528/293; 528/295; 528/298; 528/299; 528/300; 528/301; 528/302; 528/305; 528/307; 528/308; 528/26; 528/28; 528/29; 528/30; 528/32; 528/40; 528/42; 524/601; 524/602; 524/603; 524/606; 524/607; 524/608; 524/609; 252/301.16; 252/301.19; 252/301.35; 428/357; 428/481; 209/3.3; 209/577

[58] Field of Search .............. 528/272, 288, 289, 290, 528/291, 292, 293, 295, 298, 299, 300, 301, 302, 305, 307, 308, 26, 28, 30, 32, 40, 42; 524/601, 602, 603, 606, 607, 608, 609; 252/301.16, 301.19, 301.35; 428/357, 481; 209/3.3, 577

[56] References Cited

U.S. PATENT DOCUMENTS

| | | | |
|---|---|---|---|
| 4,231,133 | 11/1980 | Di Giacomo | 209/3.3 |
| 4,250,078 | 2/1981 | McFarlane et al. | |
| 4,408,004 | 10/1983 | Pengilly | 524/398 |
| 4,420,581 | 12/1983 | McFarlane et al. | 524/431 |
| 4,423,814 | 1/1984 | White | 209/3.3 |
| 4,476,272 | 10/1984 | Pengilly | 524/398 |
| 4,535,118 | 8/1985 | Pengilly | 524/398 |
| 4,540,595 | 9/1985 | Acitelli et al. | 427/7 |
| 4,541,438 | 9/1985 | Parker et al. | 128/664 |
| 4,606,859 | 8/1986 | Duggan et al. | 540/122 |
| 4,649,064 | 3/1987 | Jones | 427/256 |
| 4,704,309 | 11/1987 | Coney et al. | 427/258 |
| 4,738,785 | 4/1988 | Langston et al. | 210/738 |
| 4,883,714 | 11/1989 | Stockl et al. | 428/412 |
| 4,904,567 | 2/1990 | Maeda et al. | 430/270 |
| 4,910,292 | 3/1990 | Blount | 528/272 |
| 4,915,827 | 4/1990 | Rosenthal | 209/577 |
| 4,973,656 | 11/1990 | Blount | 528/272 |
| 4,983,817 | 1/1991 | Dolash et al. | 235/462 |
| 5,006,598 | 4/1991 | Adams et al. | 524/601 |
| 5,055,500 | 10/1991 | Peters et al. | 523/319 |
| 5,093,147 | 3/1992 | Andrus et al. | 427/7 |
| 5,143,671 | 9/1992 | Peters et al. | 264/117 |
| 5,169,881 | 12/1992 | Peters et al. | 523/319 |
| 5,201,921 | 4/1993 | Luttermann et al. | 8/506 |
| 5,218,042 | 6/1993 | Kuo et al. | 524/601 |
| 5,260,052 | 11/1993 | Peters et al. | 424/63 |

Primary Examiner—Samuel A. Acquah
Attorney, Agent, or Firm—Bernard J. Graves, Jr.

[57] ABSTRACT

Provided are water-dissipatable, sulfo-containing polyesters and polyester-amides having copolymerized therein thermally stable near infrared flourophoric compounds. The polymers are useful in coating or ink compositions, which are in turn useful for marking articles for identification/authentication purposes. Also provided is a method for invisibly marking such articles and a method for detecting and sorting articles by utilizing the near infrared flourophoric ink or coating compositions.

7 Claims, 2 Drawing Sheets

WATER-DISSIPATABLE POLYESTERS AND AMIDES CONTAINING NEAR INFRARED FLUORESCENT COMPOUNDS COPOLYMERIZED THEREIN

This is a divisional application of copending application Ser. No. 08/019,535 filed on Feb. 18, 1993, now U.S. Pat. No. 5,292,855.

FIELD OF THE INVENTION

This invention belongs to the field of organic chemistry. In particular, this invention relates to certain water-dissipatable polyester or polyester-amide polymers which contain thermally stable, near infrared fluorescing compounds copolymerized therein. The novel polymers have are useful as inks, paints, film forming compositions, etc. for marking various items for subsequent detection/identification.

BACKGROUND OF THE INVENTION

It is known (U.S. Pat. No. 4,540,595) that one may mark documents such as bank checks by the use of inks that fluoresce in the near infrared region, i.e., generally between 650 and 800 nm, for automatic identification. Fluorescent phenoxazine dyes of the formula wherein $R_1$ and R are alkyl and $X^-$ is an anion are shown to be effective near-infrared fluorescing compounds for this purpose. Attempts to use these compounds to impart fluorescence in the near infrared by adding them to water dissipatable polymers have failed because of poor thermal stability.

It has been proposed (G. Patonay, Analytical Chemistry, Vol. 63, No. 6, 1991, pp 321-327) to use near infrared fluorescent compounds for fluorogenic labels for biomolecules; however, the disclosed fluorescent compounds have poor thermal stability and are not suitable for adding to water-dissipatable polymers during preparation.

This present invention, as described below, relates to water-dissipatable (i.e., dispersible) polymeric compositions which are useful in the formulation of near infrared fluorescent inks, paints and film forming compositions. The polymeric compositions are unique in that the near infrared fluorophores (NIRF's) are copolymerized therein and thus are not extractable, exudable, sublimable or leachable from the polymeric composition. Also, since the NIRF is bound to polymer chain by covalent bonds or incorporated into the backbone of the polymer by covalent bonds, toxicological concerns are minimized because of low potential for exposure to humans. The inks, paints and film forming compositions prepared from the polymeric compositions of this invention are especially useful in "marking" or "tagging" various items, e.g. security documents, bank checks and other printed or coated materials where subsequent detection or identification is desired.

SUMMARY OF THE INVENTION

The present invention provides certain water-dissipatable (i.e., dispersible) polymeric compositions which have near infrared fluorophoric (NIRF) moieties copolymerized therein. Such compositions are useful as coatings or inks, when an invisible identification mark is desired on an article. For example, such compositions can be applied to the outside surface of rigid or flexible polymeric containers, thus providing a method for identification of the containers by polymeric class.

BRIEF DESCRIPTION OF THE DRAWINGS

FIG. 1 depicts an apparatus useful for practicing the present invention for identification of the near infrared (NIR) marker in the polymer described herein. This arrangement will be understood to be an application of commercially available fluorometers. As may be seen from FIG. 1, there is present a light source (1) capable of emitting radiation in the visible and NIR region which illuminates the polymer sample (2) through a wavelength selector (3) e.g., monochromator or interference filter. A wavelength selector (4) and a NIR sensitive photodetector (5) is placed at 90° or less angle. It may be seen from FIG. 1 that light source (1), wavelength selector (3 & 4) and photodetector (5) are all arranged on two sides of a triangle to minimize scattered light entering the detector. The light source (1) in FIG. 1 may be replaced with lasers, preferably semiconductor lasers. The output of photodetector (5) is provided to level adjustment amplifier (6), the output of which is provided to an integrated circuit digital multimeter (7). The output of the digital multimeter is connected to a computer display so as to provide a numeral and graphical indication of the amount of luminous flux at the predetermined wavelength (preferably at the emission maxima) emitted by the substance contained in the polymer.

FIG. 2 shows a preferred apparatus useful for practice of the present invention which will be understood to be a specialized arrangement for performing the tests of the present invention. As may be seen from FIG. 2, there is present a laser diode light source (1) capable of emitting radiation in the NIR region which is collimated through a collimating lens (2), and illuminates the NIRF-marked article (4) through an optical filter (3), A focusing lens (5) and a beam compressor are placed at 30 degrees or less angle, It may be seen from FIG. 2 that the laser diode light source and the collimating lens are arranged to minimize scattered light from entering the detector, An optical filter (6) is placed between the compressor lenses (7 & 8) to select the wavelength of fluorescence of the tagging molecule which is focused on the photodetector, A current-to-voltage converter is connected to the photodetector (9) to amplify the detector signal, The arrangement and the electronic circuitry of the current-to-voltage amplifier (10) is widely known and the routines of amplifying and processing the photodetector signal are also well-known, The signal from the current-to-voltage converter circuit is detected by a threshold detector (11), The threshold level of the threshold detector is set at the level required to minimize any interference from untagged articles, The presence of tagged articles in front of the preferred apparatus is indicated by the light-emitting diode (LED) indicator (12), FIGS. 1 and 2 are more fully described below,

DETAILED DESCRIPTION OF THE INVENTION

The present invention provides a water-dissipatable polymer comprising:

(i) monomer residues of at least one dicarboxylic acid;
(ii) about 4 to 25 mole percent, based on the total of all acid, hydroxy and amino equivalents, of monomer residues of at least one difunctional sulfo monomer containing at least one sulfonate group bonded to an aromatic ring where the functional groups are hydroxy, carboxyl or amino;
(iii) monomer residues of at least one diol or a mixture of a diol and a diamine; and optionally:
(iv) monomer residues of at least one difunctional monomer reactant selected from hydroxycarboxylic acids, aminocarboxylic acids and aminoalkanols;

provided that at least 20 percent of the groups linking the monomeric units are ester linkages; said water dissipatable polyester having from about 0.1 ppm by weight to about 10% by weight of a thermally stable near infrared flouorphoric compound copolymerized therein.

In a preferred embodiment of the present invention, component (iii) is comprised of

(a) at least 15 mole percent, based on the total mole percent of diol monomer residues or diol and diamine monomer residues, of a diol having the formula —$(OCH_2CH_2)_n$— where n is 2 to about 20, or
(b) about 0.1 to less than about 15 mole percent, based on the total mole percent of diol monomer residues or diol and diamine monomer residues, of monomer residues of a poly(ethylene glycol) having the formula —$(OCH_2CH_2)_n$— where n is 2 to about 500, provided that the mole percent of such residues is inversely proportional to the value of n.

Some of the compounds useful in the practice of this invention are known [GB 1,537,375; U.S. Pat. Nos. 4,606,859 and 4,904,567; U.K. Pat. Appl. GB 2,168,372; JACS, 1984, 106, pp 7404–7410; Jap. Pat. 61,215,663 (CA Vol. 114: 196445p); Jap. Pat. 90,187,391 (CA Vol. 114: 196418g)]; however, the compounds are used for optical recording devices, liquid crystal displays, electrochemical chemiluminescence and as colorants.

The preferred near infrared fluorescent compounds useful in the practice of this invention are described in copending U.S. Ser. No. 07/789,570, entitled "Method for Tagging Thermoplastic Materials With Near Infrared Fluorophores", incorporated herein by reference.

The preferred near infrared fluorescent compounds useful in the practice of the invention are selected from the classes of phthalocyanines, naphthalocyanines and squaraines (derivatives of squaric acid) and correspond to Formulae II, III and IV:

(II)

(III)

(IV)

wherein

Pc and Nc represent the phthalocyanine and naphthalocyanine moieties of Formulae IIa and IIIa, Phthalocyanine IIa

2,3-Naphthalocyanine

IIIa respectively, covalently bonded to hydrogen or to various metals, halometals, organometallic groups, and oxymetals including AlCl, AlBr, AlF, AlOH, AlOR$_5$, AlSR$_5$, Ca, Co, CrF, Fe, Ge, Ge(OR$_6$), Ga, InCl, Mg, Mn, Ni, Pb, Pt, Pd, SiCl$_2$, SiF$_2$, SnCl$_2$, Sn(OR$_6$)$_2$, Si(OR$_6$)$_2$, Sn(SR$_6$)$_2$, Si(SR$_6$)$_2$, Sn, TiO, VO or Zn, wherein R$_5$ and R$_6$ are selected from hydrogen, alkyl, aryl, heteroaryl, lower alkanoyl, trifluoroacetyl, groups of the formulae

$R_7$, $R_8$ and $R_9$ are independently selected from alkyl, phenyl or phenyl substituted with lower alkyl, lower alkoxy or halogen;

X is selected from oxygen, sulfur, selenium, tellurium or a group of the formula N-$R_{10}$, wherein $R_{10}$ is hydrogen, cycloalkyl, alkyl, acyl, alkylsulfonyl, or aryl or $R_{10}$ and R taken together form an aliphatic or aromatic ring with the nitrogen atom to which they are attached;

Y is selected from alkyl, aryl, halogen or hydrogen;

R is selected from unsubstituted or substituted alkyl, alkenyl, alkynyl, $C_3$-$C_8$ cycloalkyl, aryl, heteroaryl, or

—(X-R)$_m$ is alkylsulfonylamino, arylsulfonylamino, or a group selected from the formulae —X($C_2H_4O$)$_zR^1$, wherein $R^1$ is hydrogen or R as defined above; Z is an integer of from 1–4;

or two —(X-R)$_m$ groups can be taken together to form divalent substituents of the formula wherein each $X^1$ is independently selected from —O—, —S—, or —N-$R_{10}$ and A is selected from ethylene; propylene; trimethylene; and such groups substituted with $C_1$-$C_4$ alkyl, $C_1$-$C_4$ alkoxy, aryl and cycloalkyl; 1,2-phenylene and 1,2-phenylene containing 1–3 substituents selected from $C_1$-$C_4$ alkyl, $C_1$-$C_4$ alkoxy or halogen;

$R_1$ and $R_2$ are independently selected from hydrogen, lower alkyl, lower alkoxy, halogen, aryloxy, lower alkylthio, arylthio, lower alkylsulfonyl; arylsulfonyl; lower alkyl-sulfonylamino, arylsulfonylamino, cycloalkylsulfonylamino, carboxy, unsubstituted and substituted carbamoyl and sulfamoyl, lower alkoxycarbonyl, hydroxy, lower alkanoyloxy, $R_3$ and $R_4$ are independently selected from hydrogen, lower alkyl, alkenyl or aryl; n is an integer from 0–12; $n_1$ is an integer from 0–24, m is an integer from 4–16; $m_1$ is an integer from 0–16, provided that the sums of n+m and $n_1$+$m_1$ are 16 and 24, respectively.

In a preferred embodiment of this aspect of the present invention m is from 4 to 12; $m_1$ is from 0–8; provided that in the definitions of the substituents (Y)n, (Y)$n_1$ and (—X-R)$m_1$ that these substituents are not present when n, $n_1$ and $m_1$ are zero, respectively. Substituents (X-R)m and (Y)n are present in compounds IIa on the peripheral carbon atoms, i.e. in positions 1, 2, 3, 4, 8, 9, 10, 11, 15, 16, 17, 18, 22, 23, 24, 25 and substituents (X-R)$m_1$ and (Y)$n_1$ are present on the peripheral carbon atoms of III, i.e. in positions 1, 2, 3, 4, 5, 9, 10, 11, 12, 13, 14, 18, 19, 20, 21, 22, 23, 27, 28, 29, 30, 31, 32 and 36.

In the above definitions, the term alkyl is used to designate a straight or branched chained hydrocarbon radical containing 1–12 carbons.

In the terms lower alkyl, lower alkoxy, lower alkylthio, lower alkoxycarbonyl, lower alkanoyl and lower alkanoyloxy the alkyl portion of the groups contains 1–6 carbons and may be a straight or branched chain.

The term "cycloalkyl" is used to represent a cyclic aliphatic hydrocarbon radical containing 3–8 carbons, preferably 5 to 7 carbons.

The alkyl and lower alkyl portions of the previously defined groups may contain as further substituents one or more groups selected from hydroxy, halogen, carboxy, cyano, $C_1$-$C_4$-alkoxy, aryl, $C_1$-$C_4$-alkylthio, arylthio, aryloxy, $C_1$-$C_4$-alkoxycarbonyl or $C_1$-$C_4$-alkanoyloxy. naphthyl, and such radicals substituted with one or more substituents selected from lower alkyl, lower alkoxy, halogen, lower alkylthio, N(lower alkyl)$_2$, trifluromethyl, carboxy, lower alkoxycarbonyl, hydroxy, lower alkanoylamino, lower alkylsulfonylamino, arylsulfonylamino, cycloalkylsulfonylamino, lower alkanoyloxy, cyano, phenyl, phenylthio and phenoxy.

The term "heteroaryl" is used to represent mono or bicyclic hetero aromatic radicals containing at least one "hetero" atom selected from oxygen, sulfur and nitrogen or a combination of these atoms. Examples of suitable heteroaryl groups include: thiazolyl, benzothiazolyl, pyrazolyl, pyrrolyl, thienyl, furyl, thiadiazolyl, oxadiazolyl, benzoxazolyl, benzimidazolyl, pyridyl, pyrimidinyl and triazolyl. These heteroaryl radicals may contain the same substituents listed above as possible substituents for the aryl radicals. The term triazolyl also includes structure V and mixed isomers thereof, wherein $R_{11}$ is hydrogen or selected from lower alkyl and lower alkyl substituted with one or two groups selected from hydroxy, halogen, carboxy, lower alkoxy, aryl, cyano, cycloalkyl, lower alkanoyloxy or lower alkoxycarbonyl.

The terms "alkenyl and alkynyl" are used to denote aliphatic hydrocarbon moiety having 3–8 carbons and containing at least one carbon-carbon double bond and one carbon-carbon triple bond, respectively.

The term halogen is used to include bromine, chlorine, fluorine and iodine.

The term "substituted alkyl" is used to denote a straight or branched chain hydrocarbon radical containing 1-12 carbon atoms and containing as substituents 1 or 2 groups selected from hydroxy, halogen, carboxy, cyano, $C_1$-$C_4$ alkoxy, aryl, $C_1$-$C_4$ alkylthio, arylthio, aryloxy, $C_1$-$C_4$ alkoxycarbonyl, or $C_1$-$C_4$ alkanoyloxy.

The term "substituted carbamoyl" is used to denote a radical having the formula —$CONR_{12}R_{13}$, wherein $R_{12}$ and $R_{13}$ are selected from unsubstituted or substituted alkyl, alkenyl, alkynyl, cycloalkyl, aryl, or heteroaryl.

The term "substituted sulfamoyl" is used to denote a radical having the formula —$SO_2NR_{12}R_{13}$, wherein $R_{12}$ and $R_{13}$ are as defined above.

The term "alkylene" refers to a divalent $C_1$-$C_{12}$ aliphatic hydrocarbon moiety, either straight or branched-chain, and either unsubstituted or substituted with one or more groups selected from lower alkoxy, halogen, aryl, or aryloxy.

The term "acyl" refers to a group of the formula $R°C(O)$—O—, wherein $R°$ is preferably a $C_1$-$C_{10}$ alkyl moiety. The term "alkyl sulfonyl" refers to a group of the formula $R° SO_2$—, wherein $R°$ is as defined for acyl.

Preferred —X-R groups include those listed in Table I below.

In the compounds above, it should be recognized that the structures must bear at least one polyester reactive group to allow the compound to be incorporated into the polymeric composition and to be bound by covalent bonds.

The water-dissipatable polymers, without the near infrared fluorescent compounds incorporated therein, are described in U.S. Pat. Nos. 3,734,874; 3,779,993; 3,828,010; 3,546,008; 4,233,196; and 4,335,220, incorporated herein by reference.

The polymers of the present invention are, for the most part, water-dispersible because they form electrostatically-stabilized colloids when mixed with water. The colloid particle size varies with the polymer composition but has been shown by light diffraction studies and transmission electron microscopy (on fresh films) to be mostly 200–800 Å in diameter. The aqueous colloid dispersions exhibit a minimum precipitation of solid material with time, in the temperature range of 0.1°–99.9° C. because the relationship between the particle densities and viscosities (very similar to those of water when concentrations are less than 30 weight percent) are such that thermal energy expressed as Brownian motion is sufficient to keep the particles suspended in water.

The water-dispersible polyesters have an inherent viscosity of at least 0.1 dL/g, preferably about 0.28–0.38 dL/g, when determined at 25° C. using 0.25 g polymer per 100 ml of a solvent consisting of 60 parts by weight phenol and 40 parts by weight tetrachloroethane.

The sulfonate-containing, water-dispersible, linear polymers thus comprise polyesters, including polyester-amides, consisting of repeating, alternating residues of (1) one or more dicarboxylic acids and (2) one or more diols or a combination of one or more diols and one or more diamines where, in the preceding definition, the mole percentages are based on 100 mole percent dicarboxylic acid residues and 100 mole percent diol or diol and diamine residues. Alternatively, the polymers may include residues of monomers having mixed functionality such as hydroxycarboxylic acids, aminocarboxylic acids and/or aminoalkanols. The near infrared flourophoric (NIRF) compounds can thus be incorporated into the polyester, so long as the NIRF has one, or preferably two, polyester reactive groups (e.g., hydroxy, carboxy, etc.) present.

The residues of component (i) may be derived from one or more dicarboxylic acids or their ester-forming derivatives such as dialkyl esters, bis(hydroxyalkyl) esters, acid chlorides or, in some cases, anhydrides. The sulfonate group of component (ii) may be an alkali metal sulfonic salt such as lithium, potassium or, preferably, sodium sulfonate groups, or an ammonium or substituted ammonium sulfonate.

The preferred water-dispersible polymers have an inherent viscosity of about 0.28 to 0.38 dL/g and are comprised of:

(i) diacid monomer residues comprising about 75 to 84 mole percent isophthalic acid monomer residues and about 16 to 25 mole percent 5-sodiosulfoisophthalic acid monomer residues; and (ii) diol monomer residues comprising about 45 to 60 mole percent diethylene glycol monomer residues and about 40 to 55 mole percent ethylene glycol, 1,4-cyclohexanedimethanol monomer residues or mixtures thereof.

Specific embodiments of these water-dispersible polymers are available from Eastman Chemical Products, Inc., a subsidiary of Eastman Kodak Company, in the form of pellets (EASTMAN AQ 29S Polymer, EASTMAN 38S Polymer and EASTMAN 55S Polymer) and in the form of aqueous shown to disperse in water due to the presence of 5-sodiosulfoisophthalic acid residues.

Preferably, the water dispersible polyester above contains some poly(ethylene glycol) to aid in its water dispersibility. When some poly(ethylene glycol) is used, the content of the sulfomonomer can be lower, which aids in flexibility of formulating the polyester.

The water dispersibility of the polyester is related to the weight percent of poly(ethylene glycol) and mole percent of sulfomonomer. Therefore, if the content of either is relatively low, the other should be relatively high to maintain adequate dispersibility.

The poly(ethylene glycol) need not be present in the initial reaction charge, because poly(ethylene glycol) may form in situ from decomposition products and be incorporated into the polyester chain. It is well known, for example, that diethylene glycol is formed in situ in such reactions.

In the preferred form of the present invention, the polyester contains repeating units of a poly(ethylene glycol) of the formula H—$(OCH_2$—$CH_2)_n$—OH wherein n is an integer of 2 to 500. The value of n is preferably from between about 2 to about 20. The values of n and the mole percent of poly(ethylene glycol) in the polyester, if used, are adjusted such that the mole percent of poly(ethylene glycol) within the stated range is inversely proportional to the quantity of n within the stated ranges. Thus, when the mole percent is high, the value of n is low. On the other hand, if the mole percent is low, the value of n is high. It is apparent, therefore, that the weight percent (product of mole percent and molecular weight) of the poly(ethylene glycol) is an important consideration because the water dissipatability of the copolyester decreases as the weight percent poly(ethylene glycol) in the copolyester decreases. For example, if the weight of poly(ethylene glycol) is too low, the water dissipatability of the copolyester may be inadequate. Furthermore, the weight percent of poly(ethylene glycol) is preferably adjusted such that it is inversely proportional to the mole percent of the difunctional sulfomonomer because the water dissipatability of the copolyester is a function of both the mole percent sulfomonomer and the weight percent polyethylene glycol.

Examples of suitable poly(ethylene glycols) include relatively high molecular weight polyethylene glycols, some of which are available commercially under the designation CARBOWAX, a product of Union Carbide. Diethylene glycol is also especially suitable.

Other useful glycols for preparing copolyesters include aliphatic, alicyclic and aralkyl glycols. Examples of these glycols include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol, 1,4-butanediol, 1,5-pentanediol, 1,6-hexanediol, 2,2,4-trimethyl-1,6-hexanediol; thiodiethanol. 1,2-cyclohexanedimethanol, 1,3-cyclohexandimethanol; 1,4-cyclohexanedimethanol; 2,2,4,4-tetramethyl-1,3-cyclobutanediol; and p-xylylenediol.

The dicarboxylic acid component of the polyesters are preferably selected from aliphatic dicarboxylic acids, alicyclic dicarboxylic acids, aromatic dicarboxylic acids, or mixtures of two or more of these acids. Examples of such dicarboxylic acids, include succinic; glutaric; adipic; azelaic; sebacic; 1,4-cyclohexanedicarboxylic; phthalic; terephthalic and isophthalic acid. Terephthalic acid and isophthalic acid are preferred as the carboxylic acid component of the polyester.

It should be understood that use of the corresponding acid anhydrides, esters, and acid chlorides of these acids is included in the term "dicarboxylic acid."

The difunctional sulfomonomer component of the polyester may advantageously be a dicarboxylic acid or an ester thereof containing a metal sulfonate group, a glycol containing a metal sulfonate group or a hydroxy acid containing a metal sulfonate group. The metal ion of the sulfonate salt may be Na+, Li+, K+ and the like. When a monovalent alkali metal ion is used, the resulting polyesters are less readily dissipated by cold water and more readily dissipated by hot water. When a divalent or a trivalent metal ion is used the resulting polyesters are not ordinarily easily dissipated by cold water but are more readily dissipated in hot water. It is possible to prepare the polyester using, for example, a sodium sulfonate salt and latex and by ion-exchange replace this ion with a different ion, and thus alter the characteristics of the polymer. The difunctional monomer component may also be referred to the difunctional sulfomonomer and is further described herein below.

Advantageous difunctional sulfomonomer components are those wherein the sulfonate salt group is attached to an aromatic acid nucleus such as benzene, naphthalene, diphenyl, oxydiphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters.

Particularly superior results are achieved when the difunctional sulfomonomer component is 5-sodiosulfoisophthalic acid or its esters, and the glycol is a mixture of ethylene glycol or 1,4-cyclohexanedimethanol with diethylene glycol.

Thus, this invention provides water-dissipatable, sulfo-containing polyesters and amides having copolymerized therein at about 0.1 ppm by weight to about 10% by weight, based on the final weight of the polymer, of a thermally stable, near infrared fluorescent compound. In a preferred embodiment, the near infrared fluorescent compound is present at about 1 ppm to about 1,000 ppm.

The polymeric composition of this invention allows the preparation of stable aqueous solutions/dispersions which are useful in forming films when dried, said films having the valuable property of being fluorescent when exposed to infrared radiation. The emitted light is detected by a near infrared radiation detector, thus allowing the "marking" or "tagging" of items to which the film forming polymeric composition has been applied. The near infrared fluorescent polymeric composition may be formulated into inks, paints or various coating compositions; such compositions can be applied to various objects by conventional processes. It is advantageous that the polymeric compositions of this invention can produce essentially "colorless" films when applied and yet can be detected by conventional near infrared sensitive detector units. This property allows the items or objects to which the polymeric compositions are applied to be marked "invisibly", since when added at low levels, many of the near infrared compounds used in this invention absorb little, if any, visible light.

Thus, as a further aspect of the present invention, there is provided a coating composition comprising
(I) about 20 weight percent to about 35 weight percent of a water-dissipatable polyester comprising:
  (i) monomer residues of at least one dicarboxylic acid;
  (ii) about 4 to 25 mole percent, based on the total of all acid, hydroxy and amino equivalents, of monomer residues of at least one difunctional sulfo monomer containing at least one sulfonate group bonded to an aromatic ring where the functional groups are hydroxy, carboxyl or amino;
  (iii) monomer residues of at least one diol or a mixture of a diol and a diamine comprising:
    (a) at least 15 mole percent, based on the total mole percent of diol monomer residues or diol and diamine monomer residues, of a diol having the formula $-(OCH_2CH_2)_n-$ where n is 2 to about 20, or
    (b) about 0.1 to less than about 15 mole percent, based on the total mole percent of diol monomer residues or diol and diamine monomer residues, of monomer residues of a poly(ethylene glycol) having the formula $-(OCH_2CH_2)_n-$ where n is 2 to about 500, provided that the mole percent of such residues is inversely proportional to the value of n; and optionally,
  (iv) monomer residues of at least one difunctional monomer reactant selected from hydroxycarboxylic acids, aminocarboxylic acids and aminoalkanols; provided that at least 20 percent of the groups linking the monomeric units are ester linkages; said water dissipatable polyester having from about 0.1 ppm by weight to about 10% by weight of a thermally stable near infrared flouorphoric residue copolymerized therein; and
(II) about 65 weight percent to about 80 weight percent of water.

As as a further aspect of the present invention, there is provided a method for invisibly marking, for identification purposes, an article with the water-dispersible polymers of the present invention, wherein said polymers have from about 0.1 to about 10.0 ppm of a residue of a near infrared flourescing compound copolymerized therein, which comprises applying to said article a composition comprising (I) about 20 weight percent to about 35 weight percent of a water-dissipatable polyester comprising:
  (i) monomer residues of at least one dicarboxylic acid;
  (ii) about 4 to 25 mole percent, based on the total of all acid, hydroxy and amino equivalents, of monomer residues of at least one difunctional sulfo monomer containing at least one sulfonate group bonded to an aromatic ring where the functional groups are hydroxy, carboxyl or amino;
  (iii) monomer residues of at least one diol or a mixture of a diol and a diamine comprising:
    (a) at least 15 mole percent, based on the total mole percent of diol monomer residues or diol and diamine monomer residues, of a diol having the formula —$(OCH_2CH_2)_n$— where n is 2 to about 20, or
    (b) about 0.1 to less than about 15 mole percent, based on the total mole percent of diol monomer residues or diol and diamine monomer residues, of monomer residues of a poly(ethylene glycol) having the formula —$(OCH_2CH_2)_n$— where n is 2 to about 500, provided that the mole percent of such residues is inversely proportional to the value of n; and optionally,
  (iv) monomer residues of at least one difunctional monomer reactant selected from hydroxycarboxylic acids, aminocarboxylic acids and aminoalkanols; provided that at least 20 percent of the groups linking the monomeric units are ester linkages; said water dissipatable polyester having from about 0.1 ppm by weight to about 10% by weight of a thermally stable near infrared flouorphoric residue copolymerized therein; and
(II) about 65 weight percent to about 80 weight percent of water.

As a further aspect of the present invention, there is provided a method for detecting and separating articles, said articles coated with the coating composition above, said composition having detectible fluorescence when exposed to near infrared radiation, which comprises the following steps:
  (a) exposure of a mixture of articles to near infrared radiation having wavelengths of about 670–2,500 nm, with the provision that at least one of said articles is coated with a water-dissipatable, sulfo-containing polyester or polyester-amide having copolymerized therein at about 0.1 ppm by weight to about 10% by weight, based on the weight of the polymer, of a thermally stable, near infrared fluorescent compound, said polyester or polyester-amide being present in sufficient quantity to impart fluorescence when exposed to radiation having wavelengths of about 670–2,5000 nm, said radiation provided by light sources;
  (b) detection of the emitted fluorescent light via near infrared light detection means; and
  (c) separating the fluorescing articles from the non-fluorescing articles or articles fluorescing at a detectibly different wavelength or wavelengths by mechanical means.

In a preferred embodiment of this aspect of the invention the preferred coating compositions as described above are utilized.

In the above method, preferred articles include containers, papers, including commercially significant documents, or trademarked goods of any sort, wherever there is a need or desire to easily and quickly authenticate the origin of the article, by its invisible identifying near infrared (NIR) flourophoric marking or coating.

Figure 1:
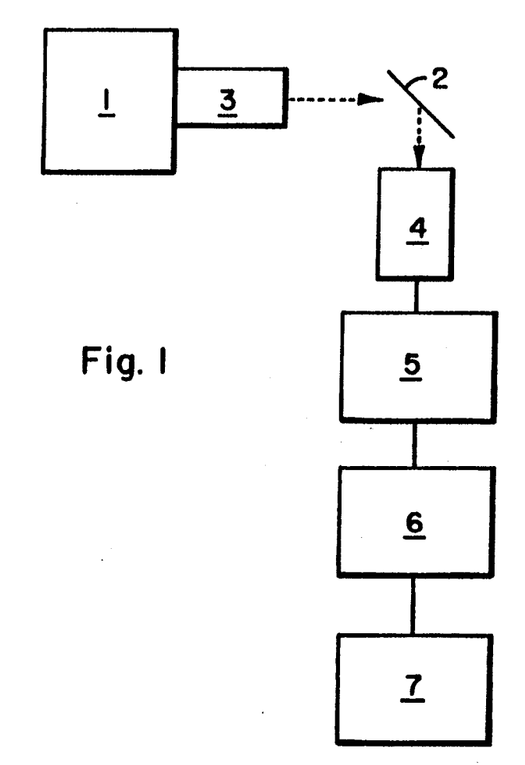

As noted above, one apparatus useful for practicing the present invention for identification of the NIRF marker in the polymer described hereinabove is shown in the drawing FIG. 1 wherein like numerals reference like parts. FIG. 1 is a pictorial diagram of the first preferred embodiment of the apparatus useful in the present invention. This arrangement will be understood to be an application of commercially available fluorometers for example currently manufactured by SLM Aminco of Urbana, Ill. This arrangement is for performing the tests of the present invention one at a time. It will be apparent that in using this apparatus, it will be necessary to perform calculations for the concentration ratio of the markers externally. As may be seen from FIG. 1, there is present a light source (1) capable of emitting radiation in the visible and NIR region which illuminates the polymer sample (2) through a wavelength selector (3) e.g., monochromator or interference filter. A wavelength selector (4) and a NIR sensitive photodetector (5) is placed at 90° or less angle. It may be seen from FIG. 1 that light source (1), wavelength selectors (3 & 4) and photodetector (5) are all arranged on two sides of a triangle to minimize scattered light entering the detector. The arrangement of the light source, wavelength selector and detector to minimize scattered light entering the detector is known to those skilled in the art and the routines of obtaining fluorescence signal are not considered novel per se. The light source (1) in FIG. 1 may be replaced with lasers, preferably semiconductor lasers. The output of photodetector (5) is provided to level adjustment amplifier (6), the output of which is provided to an integrated circuit digital multimeter. In the preferred embodiment, digital multimeter (7) is embodied by a computerized unit currently manufactured by SLM Aminco of Urbana, Ill. The output of the digital multimeter is connected to a computer display so as to provide a numeral and graphical indication of the amount of luminous flux at the predetermined wavelength (preferably at the emission maxima) emitted by the substance contained in polymer. It is of course apparent that level adjustment amplifier (6) should be adjusted to provide an output appropriately scaled to suit digital multimeter (7).

Figure 2:
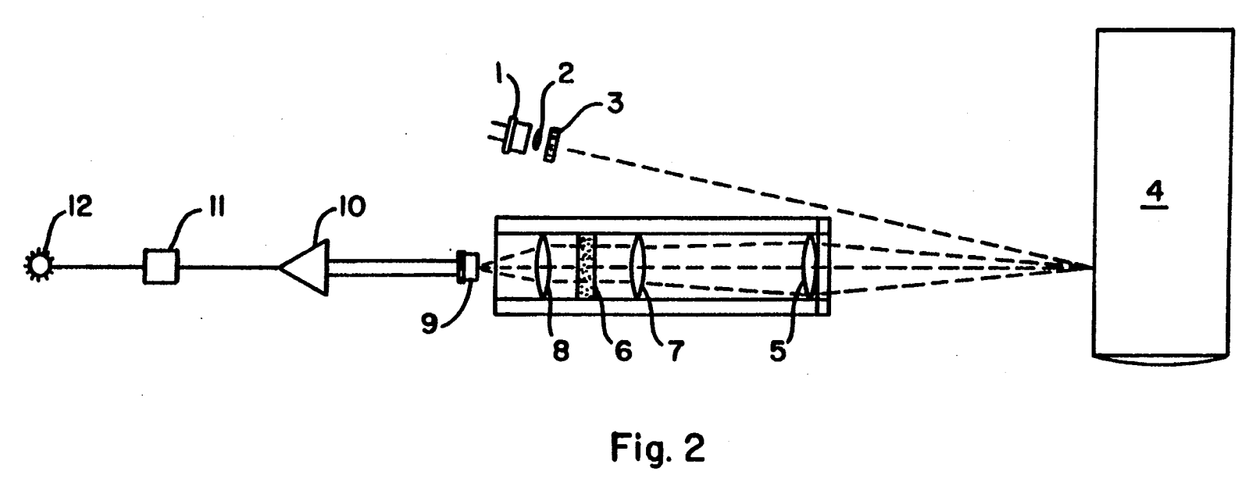

FIG. 2 shows a preferred embodiment of the apparatus useful for practice of the present invention which will be understood to be a specialized arrangement for performing the tests of the present invention. As may be seen from FIG. 2, there is present a laser diode light source (1) capable of emitting radiation in the NIR region which is collimated through a collimating lense (2), and illuminates the article (4) through an optical filter (3). A focusing lens (5) and a beam compressor are placed at 30 degrees or less angle. It may be seen from FIG. 2 that the laser diode light source and the collimating lens are arranged to minimize scattered light from entering the detector. An optical filter (6) is placed between the compressor lenses (7 & 8) to select the wavelength of fluorescence of the tagging molecule which is focused on the photodetector. A current-to-voltage converter is connected to the photodetector (9) to amplify the detector signal. The arrangement and the electronic circuitry of the current-to-voltage amplifier (10) is widely known and the routines of amplifying and processing the photodetector signal are also well-known. The signal from the current-to-voltage converter circuit is detected by a threshold detector (11).

The threshold level of the threshold detector is set at the level required to minimize any interference from untagged articles. The presence of tagged articles in front of the preferred apparatus is indicated by the LED indicator (12). The LED indicator may be replaced with appropriate mechanical or electronic actuators for physical sorting of the articles to be sorted such as air jets for moving indicated articles from one conveyor to another.

For identification of more than one type of article or category of articles, the use of more than one marker is necessary. In other words, one fluorophore can be used to mark polyester containers, another to mark high density polypropylene containers, another to mark polycarbonate containers, etc. In another application of the present invention, one marker can be used to authenticate commercial documents from one banking institution, and another can be used to identify another, and so on. In these instances, the use of more than one unit of the preferred apparatus as shown in FIG. 2 is necessary. The choice of markers is dependent on their spectral properties, wherein the absorption and fluorescence maxima are sufficiently separated from each other to allow for identification of the individual markers (e.g., about 20 nm or more). The multiplexing and computing apparatus which is programmed to calculate ratios of fluorescence signal of the markers present in the polymer is within the ability of one of ordinary skill in the art.

The dispersions or blends according to this invention may be used by applying them as a coating or ink to an article or substrate such as paper, metal foil, clay coated paper, paperboard, or thermoplastic or thermosetting polymers such as polyesters, polyolefins, polyamides, polyimides, polyvinyl chloride, polyvinylidene chloride, polyurethanes, polycarbonates, cellulose esters, polyacrylates, polyvinylesters, polyester-amides, polystyrene, acrylonitrile-butadiene-styrene, and styrene-acrylonitrile, followed by drying to leave a residue of solids in the form of a coating. Alternately, a second substrate can be applied prior to drying to form a bond between the substrates.

In the coating compositions of the present invention, it is preferred that component (I) be present in about 25 to about 30 weight percent relative to the component (II) water. Further, the compositions may contain up to about 10 weight percent of one or more additives commonly found in ink compositions, for example, waxes such as JONWAX 26, JONWAX 120 (available from S. C. Johnson and Sons, Inc., Racine, Wis., 43403; U.S.A.), or VANWAX 35 (available from Vantage, Garfield, N.J., 07026); surfactants such as SURFYNOL 104 and SURFYNOL 440, available from Air Products and Chemicals, Allentown, Pa. 18105); modifiers (e.g., de-foamers) such as WBT-409, RESOLV (available from Vantage), CARBOWET 990 (available from Vantage), OT-70 aerosol (available from McIntyre, Chicago, Ill. 60632), FOAMASTER 111 (available from Henkel Corporation, Morristown, N.J., 07960); alcohols such as n-propanol, isopropanol, propylene glycol, ethylene glycol monobutyl ether, or ethylene glycol; biocides; pH stabilizers; dispersants; thickeners such as ACRYSOL RM-825 (available from Rohm & Haas, Philadelphia, Pa. 19105); wetting agents, e.g., FLOU-RAD FC-430 and FC-431, from 3M Company; and the like.

Typically, it is desireable to add a small amount of one or more pH stabilizers to the ink or coating composition to keep the pH within a desired range. For example, it is preferred to add about 0.1 weight percent sodium acetate to an ink or aqueous solution/dispersion of the polymer/water composition.

Preferred amounts of certain additives in the ink or coating compositions of the present invention are set forth in the following table:

| Component | Weight Percent |
| --- | --- |
| Wax[a] | 0.0–3.0 |
| Surfactant[b] | 0.0–3.0 |
| Modifier[c] | 0.0–2.0 |
| Alcohol[d] | 0.0–8.0 |

[a] e.g., JONWAX 26, 120, VANWAX 35
[b] e.g., SURFYNOL 104, 440
[c] e.g , WBT 409, RESOLV, CARBOWET 990, Aerosol OT 70, FOAMASTER 111
[d] e.g., n propanol; isopropanol; propylene glycol; ethylene glycol monobutyl ether

Other description of possible additives, formulation, and use of such coating or ink compositions can be found in U.S. Pat. No. 4,996,252, incorporated herein by reference.

The practice of the invention is illustrated further by the following examples:

EXPERIMENTAL SECTION

Example 1

A mixture of methyl 1,1,2-trimethyl-1H-benz[e]-indole-7-carboxylate (tautomer is methyl 1,-dihydro-2-methylene-1, 1-dimethyl-1H-benz [e] indole-7-carboxylate), 2.67 g (0.01M) (see U.S. Pat. No. 5,030,708), squaric acid (0.57 g, 0.005M) and 2-ethoxyethanol (40 g) was heated at reflux under nitrogen for 16 hours. The reaction mixture was cooled with an ice bath and the green solid collected by filtration, washed with isopropanol and dried in air. Recrystallization from 2-ethoxyethanol (20 mL), collection of the solid by filtration, washing of the solid with isopropanol and drying gave the pure product. Mass spectrometry indicated mostly the following structure plus a small amount λmax = 690 nm (CH₂Cl₂)

of the mono 2-ethoxyethyl ester which had been produced by transesterification. In methylene chloride an absorption maximum (γ max) was observed in the visible-near infrared absorption spectrum at 690 nm (ε-214,287).

Example 2

A 300 mL 3-neck round-bottom flask was equipped with a magnetic stirrer, thermometer and gas inlet tube. Methanol (50 mL) was added followed by sodium metal (0.66 g, 0.029 mole) with stirring to facilitate reaction and solution, with a slow nitrogen purge applied. To this solution was added 12.54 g (0.058 mole) of 4-phenoxyphthalonitrile (A. W. Snow and J. R. Griffith, Macromolecules, 1984, 17, 1614–24), followed by additional methanol (50 mL). Anhydrous ammonia was bubbled in under the surface, giving an exotherm to 45° C. and total solution. The ammonia addition was continued until no more starting material was evident by thin-layer chromatography. The solution was clarified by filtering through a pad of Dicalite filter aid which had a small layer of charcoal on it and the filtrate drowned into water. The oily product layer thus produced was washed by decantation with 500 mL portions of water (4–5 times or until pH reached about 7–8). After the final wash water was decanted off, methanol was added to dissolve the product, which crystallized upon stirring overnight at room temperature. After being collected by filtration, the greenish-yellow solid was washed with methylene chloride and dried in air. The yield was 13.75 g, 91.1% of the theoretical yield. Mass spectrometry showed the product to consist largely of the desired 5-phenoxy-1,3-diiminoisoindoline.

Example 3

A mixture of 5-phenoxy-1,3-diiminoisoindoline (3.68 g, 0.016 m) (from Example 2), 1,2,3,4-tetrahydronaphthalene (20 mL) and tri-n-butylamine (10 mL) was stirred under a nitrogen sweep. Aluminum chloride (3.19 g, 0.024 m) was added to give a slurry. After the reaction mixture was heated at about 180° C. for 4 hours, it was allowed to cool to room temperature and diluted with methanol to enhance solubility to facilitate transfer into about 500 mL of ice-water mixture containing 10 mL HCl. The somewhat "greasy" solid product was collected by filtration and washed with dilute HCl. The filter cake was washed on the filter with cyclohexane and finally washed thoroughly with ethyl acetate and dried in air. Mass spectrometry indicated good quality 2(3), 9(10), 16(17), 23(24)-tetraphenoxy-Pc-Al-Cl (Pc=phthalocyanine moiety) having the desired molecular weight of 942 (1.56 g, 41.4% of the theoretical yield).

Example 4

A reaction mixture of tetraphenoxy-chloroaluminum phthalocyanine (0.94 g) of Example 3, dimethyl-3-hydroxyisophthalate (0.24 g) and pyridine (20 g) was heated at reflux for 24 hours and allowed to cool to room temperature. Isopropanol (20 mL) was added and then precipitated, by the addition of water, the phthalocyanine product, which was collected by filtration, washed with water and dried in air (yield—0.90 g). In methylene chloride, absorption maxima were observed at 696 nm (104,585), 626 nm (32,882) and 343 nm (64,090) in the ultraviolet, visible and near infrared absorption spectra.

Example 5

Preparation of Sulfo-Containing Polyester Having Near Infrared Fluorescing Compound Copolymerized Therein Components I–VII were added to a 500 mL round bottom flask which was fitted with a vacuum outlet, stirrer, condensate take off and nitrogen inlet.

I 79.54 g (0.41 m) dimethyl terephthalate
II 26.64 g (0.09 m) dimethyl 5-sodiosulfoisophthalate
III 54.06 g (0.51 m) ethylene glycol
IV 37.44 g (0.26 m) 1,4-cyclohexanedimethanol
V 0.74 g (0.009 m) anhydrous sodium acetate
VI 100 ppm Ti catalyst as titanium isopropoxide
VII 0.0138 g (1.24×10⁻⁵ m) infrared fluorescent compound [(C₆H₅O)₄ PcAlOC₆H₃-3, 4-diCO₂CH₃ (Pc=phthalocyanine)—Compound of Example 4 above]

The flask and contents were immersed in a Belmont metal bath at 200° C. with a nitrogen sweep over the reaction mixture and the temperature increased to 220° C. over two hours. To complete the polycondensation, the temperature of the reaction mixture was increased to 250° C., vacuum was applied to lower the pressure to about 0.5 mmHg, and heating at 250° C. continued for about 20 minutes. This gave a water-dissipatable polymer which contained about 100 ppm of the near infrared fluorescing compound. The polymer was extruded and pelletized.

Example 6

The procedure of Example 5 was repeated using the same conditions and reactants except that the infrared fluorescing compound which was used was the compound of Example 1 above.

Example 7

A portion (20.0 g) of the sulfo-containing water-dispersible polymer from Example 5 was added to distilled water (80.0 g) at about 80°–85° C. Good dispersion of the polymer was achieved by stirring and heating to 100° C. Upon cooling, a portion (50 g) of the aqueous dispersion was combined with 1.5 g of a solution which was prepared by combining 1 part of isopropanol with 1 part of FLORAD FC-430 (a nonionic fluorochemical wetting agent from 3M Industrial Chemical Products Division). The infrared fluorescent ink was then coated on an uncirculated $1 bill by using a K-coater with a #2RK drawdown rod (RK Print - Coat Instruments Ltd.) to give a wet coating approximately 0.0005 in. in thickness and allowed to dry. When a portion of the coated $1 bill was exposed to infrared light generated by a laser diode source and having a wavelength of about 672 nm, a broad band fluorescence was detected over the wavelength range of about 675–730 nm, yet the coating was invisible to the human eye.

Example 8

Example 7 was repeated exactly the water-dispersible polymer of Example 6 was used. The coated $1 bill had similar fluorescence properties as that produced in Example 7 when exposed to infrared light having wavelengths of about 680 nm.

Additional examples of compounds having Formulae II, III and IV are presented in Tables 3, 4 and 2, respectively.

TABLE 1

EXEMPLARY —X—R Groups

| —X—R | —X—R |
|---|---|
| —OCH$_3$ | (benzothiazol-2-ylthio) |
| —OC$_4$H$_9$-n | (pyridin-2-ylthio) |
| —OC(CH$_3$)$_3$ | (4-methyl-1,3,4-thiadiazol-2-ylthio) |
| —OC$_{12}$H$_{25}$-n | (1-(2-hydroxyethyl)-1H-tetrazol-5-ylthio) |
| —SCH$_3$ | (benzoxazol-2-ylthio) |

TABLE 1-continued

EXEMPLARY —X—R Groups

| —X—R | —X—R |
|---|---|
| —SC$_2$H$_4$OH | (1H-benzimidazol-2-ylthio) |
| —SC$_8$H$_{17}$-n | (6-methoxybenzothiazol-2-ylthio) |
| —OCH$_2$CH(C$_2$H$_5$)C$_4$H$_9$-n | (5-methoxycarbonyl-1,3,4-oxadiazol-2-ylthio) |
| —OCH$_2$CH=CH$_2$ | (4-methoxyphenylthio) |
| —OCH$_2$CH=CH—CH$_3$ | (4-methylphenyltelluro) |
| —SCH$_2$C$_6$H$_5$ | (phenylseleno) |
| —SCH$_2$CH(OH)CH$_2$OH | —OCH$_2$C$_6$H$_4$-4-COOH |
| —OCH$_2$C≡CH | —OC$_6$H$_4$-4-CH$_2$COOH |
| —N(C$_2$H$_5$)$_2$ | —OCH$_2$CH$_2$CO$_2$CH$_3$ |
| —NHC$_6$H$_5$ | —OCH$_2$CH$_2$OCOCH$_3$ |
| —N(CH$_3$)C$_6$H$_5$ | —O—C$_6$F$_5$ |
| —N(C$_2$H$_4$OH)$_2$ | —OC$_6$H$_4$-4-Cl |
| —NHC$_6$H$_{11}$ | |
| —N(piperidino) | (1-naphthyloxy) |
| | (2-naphthyloxy) |
| —OC$_6$H$_5$ | —O(CH$_2$CH$_2$O)$_2$H |
| —OC$_6$H$_4$-4-COOH | —S(CH$_2$CH$_2$O)$_2$H |
| —SC$_6$H$_4$-4-COOH | —O(CH$_2$CH$_2$O)$_4$H |
| —OC$_6$H$_3$-3,5-diCOOH | —O(CH$_2$CH$_2$O)$_3$CH$_3$ |
| —OC$_6$H$_3$-3,5-diCO$_2$CH$_3$ | —O(CH$_2$CH$_2$O)$_2$C$_6$H$_5$ |
| —SC$_6$H$_4$-2-COOH | —NH(CH$_2$CH$_2$O)$_2$H |
| —SC$_6$H$_4$-3-CO$_2$CH$_3$ | |

TABLE 1-continued

| EXEMPLARY —X—R Groups | |
|---|---|
| —X—R | —X—R |
| | —OC$_6$H$_4$-4-C$_2$H$_4$OH |
| | —OC$_6$H$_4$-4-OC$_2$H$_4$OH |

TABLE 2

| Ex. No. | R$_1$ | R$_2$ | R$_3$ | R$_4$ |
|---|---|---|---|---|
| 23 | 7-CO$_2$CH$_3$ | 7-CO$_2$CH$_3$ | CH$_3$ | CH$_3$ |
| 24 | 7-CO$_2$C$_2$H$_5$ | 7-CO$_2$C$_2$H$_5$ | C$_6$H$_5$ | C$_6$H$_5$ |
| 25 | 7-CO$_2$C$_2$H$_5$ | 7-CO$_2$C$_2$H$_5$ | C$_6$H$_4$-4-CH$_3$ | C$_6$H$_4$-4-CH$_3$ |
| 26 | 7-CONH$_2$ | 7-CONH$_2$ | H | H |
| 27 | 7-CONHC$_2$H$_4$OH | 7-CONHC$_2$H$_4$OH | H | H |
| 28 | 7-CON(CH$_3$)C$_2$H$_4$OH | 7-CON(CH$_3$)C$_2$H$_4$OH | CH$_3$ | CH$_3$ |
| 29 | 7-CON(C$_2$H$_4$OH)$_2$ | 7-CON(C$_2$H$_4$OH)$_2$ | H | H |
| 30 | 7-CONHC$_6$H$_{11}$ | 7-CONHC$_6$H$_{11}$ | C$_4$H$_9$-n | C$_4$H$_9$-n |
| 31 | 7-CONHC$_6$H$_5$ | 7-CONHC$_6$H$_5$ | H | H |
| 32 | 7-CONHCH$_2$C$_6$H$_{10}$-4-CH$_2$OH | 7-CONHC$_2$C$_6$H$_{10}$-4-CH$_2$OH | CH$_3$ | CH$_3$ |
| 33 | 7-CONHC$_6$H$_4$-4-CO$_2$CH$_3$ | 7-CONHC$_6$H$_4$-4-CO$_2$CH$_3$ | H | H |
| 34 | 7-SO$_2$NH$_2$ | 7-SO$_2$NH$_2$ | H | H |
| 35 | 7-SO$_2$N(C$_2$H$_5$)$_2$ | 7-SO$_2$N(C$_2$H$_5$)$_2$ | CH$_3$ | CH$_3$ |
| 36 | 7-SO$_2$N(CH$_3$)C$_6$H$_{11}$ | 7-SO$_2$N(CH$_3$)C$_6$H$_{11}$ | CH$_3$ | CH$_3$ |
| 37 | 7-SO$_2$N(piperidinyl) | 7-SO$_2$N(piperidinyl) | H | H |
| 38 | 7-SO$_2$N(morpholinyl) | 7-SO$_2$N(morpholinyl) | H | H |
| 39 | 7-SO$_2$N(piperazinyl) | 7-SO$_2$N(piperazinyl) | H | H |
| 40 | 7-SO$_2$NHC$_2$H$_4$OH | 7-SO$_2$NHC$_2$H$_4$OH | C$_6$H$_5$ | C$_6$H$_5$ |
| 41 | 7-SO$_2$N(CH$_3$)C$_2$H$_4$OH | 7-SO$_2$N(CH$_3$)C$_2$H$_4$OH | H | H |
| 42 | 7-SO$_2$NHC$_6$H$_4$-3-CO$_2$CH$_3$ | 7-SO$_2$NHC$_6$H$_4$-3-CO$_2$CH$_4$ | H | H |
| 43 | 7-SO$_2$NHC$_6$H$_4$-4-C$_2$H$_4$OH | 7-SO$_2$NHC$_6$H$_4$-4-C$_2$H$_4$OH | H | H |
| 44 | 7-SO$_2$NHC$_6$H$_4$-3-CH$_2$OH | 7-SO$_2$NHC$_6$H$_4$-3-CH$_2$OH | CH$_3$ | CH$_3$ |
| 45 | 7-SO$_2$NHC$_6$H$_{11}$ | 7-SO$_2$NHC$_6$H$_{11}$ | CH$_2$CH=CH$_2$ | CH$_2$CH=CH$_2$ |
| 46 | 7-CH$_3$ | 7-CH$_3$ | H | H |
| 47 | 7-OC$_6$H$_5$ | 7-OC$_6$H$_5$ | H | H |
| 48 | 7-OC$_2$H$_4$OH | 7-OC$_2$H$_4$OH | H | H |
| 49 | 7-SC$_2$H$_5$ | 7-SC$_2$H$_5$ | H | H |
| 50 | 7-SC$_6$H$_5$ | 7-S—C$_6$H$_5$ | H | H |
| 51 | 7-Br | 7-Br | CH$_3$ | CH$_3$ |
| 52 | 8-OH | 8-OH | H | H |
| 53 | 8-OCH$_3$ | 8-OCH$_3$ | H | H |
| 54 | 8-OCOCH$_3$ | 8-OCOCH$_3$ | H | H |
| 55 | H | H | H | H |
| 56 | 7-COOH | 7-COOH | H | H |
| 57 | 7-CO$_2$CH$_3$ | H | H | CH$_3$ |
| 58 | 7-CO$_2$CH$_3$ | 7-SO$_2$NHC$_2$H$_4$OH | H | H |
| 59 | H | 7-SO$_2$N(C$_2$H$_4$OH)$_2$ | H | H |
| 60 | 7-CO$_2$CH$_3$ | 7-CO$_2$CH$_3$ | C$_6$H$_5$ | CH$_3$ |
| 61 | 7-SO$_2$C$_6$H$_5$ | 7-SO$_2$C$_6$H$_5$ | H | H |
| 62 | 7-SO$_2$CH$_3$ | 7-SO$_2$CH$_3$ | H | H |
| 63 | 7-SO$_2$(CH$_2$)$_4$OH | 7-SO$_2$(CH$_2$)$_4$OH | H | H |
| 64 | 7-SO$_2$C$_6$H$_4$-3-CO$_2$CH$_3$ | 7-SO$_2$C$_6$H$_4$-3-CO$_2$CH$_3$ | H | H |

TABLE 3

PHTHALOCYANINE COMPOUNDS
(Pc = PHTHALOCYANINE NUCLEUS)

| Ex. No. | COMPOUND |
|---|---|
| 65 | 3(4), 9(10), 16(17), 23(24)-Tetraphenoxy-PcH$_2$ |
| 66 | 3(4), 9(10), 16(17), 23(24)-Tetraphenoxy-PcAlOH |
| 67 | 3(4), 9(10), 16(17), 23(24)-Tetraphenoxy-PcAl—OC$_6$H$_4$-4-CO$_2$CH$_3$ |
| 68 | 3(4), 9(10), 16(17), 23(24)-Tetraphenoxy-PcAl—SC$_6$H$_4$-2-CO$_2$CH$_3$ |
| 69 | 3(4), 9(10), 16(17), 23(24)-Tetraphenoxy-PcAl—S—C$_6$H$_4$OH |
| 70 | 3(4), 9(10), 16(17), 23(24)-Tetraphenoxy-PcCa |
| 71 | 3(4), 9(10), 16(17), 23(24)-Tetraphenoxy-PcVO |
| 72 | 3(4), 9(10), 16(17), 23(24)-Tetraphenoxy-PcInCl |
| 73 | 3(4), 9(10), 16(17), 23(24)-Tetraphenoxy-PcCrF |
| 74 | 3(4), 9(10), 16(17), 23(24)-Tetra-(4-methoxyphenoxy)-PcAlOCOCF$_3$ |
| 75 | 3(4), 9(10), 16(17), 23(24)-Tetra-(4-methoxyphenoxy)-PcNi |
| 76 | 3(4), 9(10), 16(17), 23(24)-Tetra-(4-methoxyphenoxy)-Sn |
| 77 | 3(4), 9(10), 16(17), 23(24)-Tetra-(4-methoxyphenoxy)-PcSnCl$_2$ |
| 78 | 3(4), 9(10), 16(17), 23(24)-Tetra-(4-methoxyphenoxy)-PcSn(OCOCH$_3$)$_2$ |
| 79 | 3(4), 9(10), 16(17), 23(24)-Tetra-(4-methoxyphenoxy)-PcSiF$_2$ |
| 80 | 3(4), 9(10), 16(17), 23(24)-Tetra-(4-methoxyphenoxy)-PcCo |
| 81 | 3(4), 9(10), 16(17), 23(24)-Tetra-(4-t-butylphenylthio)-PcH$_2$ |
| 82 | 3(4), 9(10), 16(17), 23(24)-Tetra-(4-t-butylphenylthio)-PcAlCl |
| 83 | 3(4), 9(10), 16(17), 23(24)-Tetra-(4-t-butylphenylthio)-PcAlOCOCF$_3$ |
| 84 | 3(4), 9(10), 16(17), 23(24)-Tetra-(4-t-butylphenylthio)-PcGe |
| 85 | 3(4), 9(10), 16(17), 23(24)-Tetra-(4-t-butylphenylthio)-PcGa |
| 86 | 3(4), 9(10), 16(17), 23(24)-Tetra-(4-t-butylphenoxy)-PcSiCl$_2$ |
| 87 | 3(4), 9(10), 16(17), 23(24)-Tetra-(4-t-butylphenoxy)-PcSiOH |
| 88 | 3(4), 9(10), 16(17), 23(24)-Tetra-(4-t-butylphenoxy)-PcSi(OC$_2$H$_4$OH)$_2$ |
| 89 | 3(4), 9(10), 16(17), 23(24)-Tetra-(4-t-butylphenoxy)-PcSi(OC$_4$H$_9$-n)$_2$ |
| 90 | 3(4), 9(10), 16(17), 23(24)-Tetra-(4-t-butylphenoxy)-PcZn |
| 91 | 3(4), 9(10), 16(17), 23(24)-Tetra-(4-t-butylphenoxy)-Pc—Mg |
| 92 | 3(4), 9(10), 16(17), 23(24)-Tetra-(4-t-butylphenoxy)-PcMn |
| 93 | 3(4), 9(10), 16(17), 23(24)-Tetra-(4-t-butylphenoxy)-PcPt |
| 94 | 3(4), 9(10), 16(17), 23(24)-Tetra-(4-t-butylphenoxy)-PcPd |
| 95 | 3(4), 9(10), 16(17), 23(24)-Tetra-(4-t-butylphenoxy)-PcPb |
| 96 | 3(4), 9(10), 16(17), 23(24)-Tetra-(4-t-butylphenoxy)-PcSi(OCOCH$_3$)$_2$ |
| 97 | 3(4), 9(10), 16(17), 23(24)-Tetra-(4-t-butylphenoxy)-PcSiF$_2$ |
| 98 | 3(4), 9(10), 16(17), 23(24)-Tetra-(2-hydroxyethoxy)-PcAlOH |
| 99 | 3(4), 9(10), 16(17), 23(24)-Tetra-(2-hydroxyethylthio)-PcAlOCOCF$_3$ |
| 100 | 3(4), 9(10), 16(17), 23(24)-Tetra-(4-carbomethoxyphenoxy)-PcSiCl$_2$ |
| 101 | 3(4), 9(10), 16(17), 23(24)-Tetra-(2-carboxyphenylthio)-PcSi(OH)$_2$ |
| 102 | 3(4), 9(10), 16(17), 23(24)-Tetra-(3-carbomethoxyphenylthio)-PcH$_2$ |
| 103 | 3(4), 9(10), 16(17), 23(24)-Tetra-n-butoxy-PcVO |
| 104 | 3(4), 9(10), 16(17), 23(24)-Tetraallyloxy-PcSn(OCOCF$_3$)$_2$ |
| 105 | 3(4), 9(10), 16(17), 23(24)-Tetrabenzyloxy-PcZn |
| 106 | 3(4), 9(10), 16(17), 23(24)-Tetracyclohexyloxy-PcSi[OC(C$_6$H$_5$)$_2$]$_2$ |
| 107 | 3(4), 9(10), 16(17), 23(24)-Tetrabenzothiazol-2-ylthio-PcH$_2$ |
| 108 | 3(4), 9(10), 16(17), 23(24)-Tetrabenzothiazol-2-ylthio-PcAlCl |
| 109 | 3(4), 9(10), 16(17), 23(24)-Tetrabenzoxazol-2-ylthio-PcAlOCCOCF$_3$ |
| 110 | 3(4), 9(10), 16(17), 23(24)-Tetra(5-methyl-1,3,4-thiazol-2-ylthio)-PcH$_2$ |
| 111 | 3(4), 9(10), 16(17), 23(24)-Tetra-2-pyridylthio-PcSi(OC$_6$H$_5$)$_2$ |
| 112 | 3(4), 9(10), 16(17), 23(24)-Tetraphenylseleno-PcNi |
| 113 | 3(4), 9(10), 16(17), 23(24)-Tetra-n-octylthio-PcSi(OC$_6$H$_4$-4-F)$_2$ |
| 114 | 3(4), 9(10), 16(17), 23(24)-Tetra-(2-naphthylthio)-PcAlOH |
| 115 | 3(4), 9(10), 16(17), 23(24)-Tetradiethylamino-PcH$_2$ |
| 116 | 3(4), 9(10), 16(17), 23(24)-Tetrapiperidino-PcSn(OCOCF$_3$)$_2$ |
| 117 | 3(4), 9(10), 16(17), 23(24)-Tetratriazol-3-ylthio-PcSiCl$_2$ |
| 118 | 3(4), 9(10), 16(17), 23(24)-Tetratriazol-3-ylthio-PcAl—OCOCF$_3$ |
| 119 | 3(4), 9(10), 16(17), 23(24)-Tetra(4-methoxyanilino)-Pc—SnCl$_2$ |
| 120 | 3(4), 9(10), 16(17), 23(24)-Tetra(4-dodecyloxyphenoxy)-PcIn—Cl |
| 121 | 3(4), 9(10), 16(17), 23(24)-Tetra(2-naphthyloxy)-PcH$_2$ |
| 122 | 3(4), 9(10), 16(17), 23(24)-Tetra(4-carbomethoxyphenylthio)-Pc—AlOH |
| 123 | 1,4,8,11,15,18,22,25-Octamethoxy-2,3,9,10,16,17,23,24-Octachloro-PcSi(OH)$_2$ |
| 124 | 1,4,8,11,15,18,22,25-Octamethoxy-2,3,9,10,16,17,23,24-Octachloro-PcAl—Cl |
| 125 | 1,4,8,11,15,18,22,25-Octamethoxy-2,3,9,10,16,17,23,24-Octachloro-PcAlOCOCF$_3$ |
| 126 | 1,4,8,11,15,18,22,25-Octamethoxy-2,3,9,10,16,17,23,24-Octachloro-PcVO |
| 127 | Hexadecachloro-PcAlOH |
| 128 | Hexadecaanilino-PcH$_2$ |
| 129 | Hexadeca(4-methylphenylthio)-PcSi(OC$_6$F$_5$)$_2$ |
| 130 | 1,4,8,11,15,18,22,25-Octaphenoxy-PcSiF$_2$ |
| 131 | 1,4,8,11,15,18,22,25-Octaphenylthio-PcSi[O—Si(CH$_3$)$_2$C$_6$H$_5$]$_2$ |
| 132 | 1,4,8,11,15,18,22,25-Octa-n-hexyloxyphenoxy-PcH$_2$ |
| 133 | 1,4,8,11,15,18,22,25-Octa-(4-methylthiophenylthio)PcFe |
| 134 | 2,3,9,10,16,17,23,24-Octachloro-Pc—Al—OH |
| 135 | 2,3,9,10,16,17,23,24-Octabromo-Pc—AlOCOCF$_3$ |
| 136 | 2,3,9,10,16,17,23,24-Octafluoro-Pc—SiCl$_2$ |
| 137 | 2,3,9,10,16,17,23,24-Octaphenylthio-PcSi(OC$_6$H$_5$)$_2$ |
| 138 | 2,3,9,10,16,17,23,24-Octa(2-hydroxyethoxy)PcSi[OC$_6$H$_4$-4-COOH]$_2$ |
| 139 | 2,3,9,10,16,17,23,24-Octa(2-hydroxyethylthio)PcSi(OCOCF$_3$)$_2$ |
| 140 | 2,3,9,10,16,17,23,24-Octa(t-butoxyphenoxy)-PcH$_2$ |
| 141 | 2,3,9,10,16,17,23,24-Octabenzothiazol-2-ylthio-PcAlOH |
| 142 | 1,4,8,11,15,18,22,25-Octa(3-methylbutoxy)-2,3,9,10,16,17,23,24- |

TABLE 3-continued

PHTHALOCYANINE COMPOUNDS
(Pc = PHTHALOCYANINE NUCLEUS)

| Ex. No. | COMPOUND |
|---|---|
| | octaphenylthio-PcAlOH |
| 143 | 1,4,8,11,15,18,22,25-Octa(3-methylbutoxy)-2,3,9,10,16,17,23,24-octaphenoxy-PcSi(OH)$_2$ |
| 144 | 1,4,8,11,15,18,22,25-Octa(3-methylbutoxy)-2,3,9,10,16,17,23,24-octa-n-butylthio-PcH$_2$ |
| 145 | 1,4,8,11,15,18,22,25-Octafluoro-2,3,9,10,16,17,23,24-octaphenylthio-PcAlOC$_6$H$_4$-4-CO$_2$CH$_3$ |
| 146 | 1,4,8,11,15,18,22,25-Octafluoro-2,3,9,10,16,17,23,24-octaphenylthio-PcVO |
| 147 | 1,4,8,11,15,18,22,25-Octa(n-butoxy)-PcSi(OC$_6$H$_4$-4-CO$_2$CH$_3$)$_2$ |
| 148 | 1,4,8,11,15,18,22,25-Octa(n-butoxy)-PcAlOC$_6$H$_4$-4-CO$_2$CH$_3$ |
| 149 | 3(4), 9(10), 16(17), 23(24)-Tetraphenyl-PcAlOC$_6$H$_4$-4-CO$_2$CH$_3$ |
| 150 | 3(4), 9(10), 16(17), 23(24)-Tetra(4-carbomethoxyphenyl)-PcAlCl |
| 151 | 3(4), 9(10), 16(17), 23(24)-Tetraphenyl-PcAlOC$_6$H$_3$-3,5-(CO$_2$CH$_3$)$_2$ |
| 152 | 1,4,8,11,15,18,22,25-octa(n-pentoxy)-PcAlOC$_6$H$_3$-3,5-(CO$_2$CH$_3$)$_2$ |

TABLE 4

NAPHTALOCYANINE COMPOUNDS
(Nc = NAPHTHALOCYANINE NUCLEUS)

| Ex. No. | COMPOUND |
|---|---|
| 153 | 2(3), 11(12), 20(21), 29(30) Tetra-t-butyl-NcH$_2$ |
| 154 | 2(3), 11(12), 20(21), 29(30) Tetra-t-butyl-NcCu |
| 155 | 2(3), 11(12), 20(21), 29(30) Tetra-t-butyl-NcSi(OH)$_2$ |
| 156 | 2(3), 11(12), 20(21), 29(30) Tetra-t-butyl-NcVO |
| 157 | 2(3), 11(12), 20(21), 29(30) Tetra-t-butyl-NcAlOH |
| 158 | 2(3), 11(12), 20(21), 29(30) Tetra-t-butyl-NcAlOCOCF$_3$ |
| 159 | 2(3), 11(12), 20(21), 29(30) Tetra-t-butyl-NcZn |
| 160 | 2(3), 11(12), 20(21), 29(30) Tetra-t-butyl-NcSnCl$_2$ |
| 161 | 2(3), 11(12), 20(21), 29(30) Tetra-t-butyl-NcCo |
| 162 | 2(3), 11(12), 20(21), 29(30) Tetra-t-butyl-NcCa |
| 163 | 2(3), 11(12), 20(21), 29(30) Tetra-t-butyl-NcPd |
| 164 | 2(3), 11(12), 20(21), 29(30) Tetra-t-butyl-NcAlOC$_6$H$_4$-4-COOH |
| 165 | 2(3), 11(12), 20(21), 29(30) Tetra-t-butyl-NcAlOC$_6$H$_3$-3,5-diCO$_2$CH$_3$ |
| 166 | 2(3), 11(12), 20(21), 29(30) Tetra-t-butyl-NcSi(OC$_6$H$_4$-4-CO$_2$CH$_3$)$_2$ |
| 167 | 2(3), 11(12), 20(21), 29(30) Tetra-t-butyl-NcSn(OCOCH$_3$)$_2$ |
| 168 | 2(3), 11(12), 20(21), 29(30) Tetramethyl-NcH$_2$ |
| 169 | 2(3), 11(12), 20(21), 29(30) Tetramethoxy-NcAlOH |
| 170 | 2(3), 11(12), 20(21), 29(30) Tetramethylthio-NcAlOCCOCF$_3$ |
| 171 | NcVO |
| 172 | NcInCl |
| 173 | NcZn |
| 174 | Nc(SiOCOCF$_3$)$_2$ |
| 175 | NcMg |
| 176 | 2(3), 11(12), 20(21), 29(30) Tetra-n-butoxy-NcH$_2$ |
| 177 | 2(3), 11(12), 20(21), 29(30) Tetra-n-butoxy-NcVO |
| 178 | 2(3), 11(12), 20(21), 29(30) Tetra-n-butoxy-NcSi(OH)$_2$ |
| 179 | 2(3), 11(12), 20(21), 29(30) Tetra-n-butoxy-NcSi[OSi(C$_6$H$_5$)$_3$]$_2$ |
| 180 | 2(3), 11(12), 20(21), 29(30) Tetra-n-butoxy-NcSn[OCOCH$_3$]$_2$ |
| 181 | 2(3), 11(12), 20(21), 29(30) Tetra-n-butoxy-NcZn |
| 182 | 2(3), 11(12), 20(21), 29(30) Tetra-n-butoxy-NcMg |
| 183 | 2(3), 11(12), 20(21), 29(30) Tetradodecyloxy-NcSi(OH)$_2$ |
| 184 | 2(3), 11(12), 20(21), 29(30) Tetrabenzothiazol-2-yl-thio-NcAlOH |
| 185 | 2(3), 11(12), 20(21), 29(30) Tetrabenzimidazol-2-ylthio-NcAlOCOCF$_3$ |
| 186 | 2(3), 11(12), 20(21), 29(30) Tetraphenylseleno-NcSnCl$_2$ |
| 187 | 2(3), 11(12), 20(21), 29(30) Tetraphenyltelluro-NcSiCl$_2$ |
| 188 | 2(3), 11(12), 20(21), 29(30) Tetraanilino-NcSi(OH)$_2$ |
| 189 | 2(3), 11(12), 20(21), 29(30) Tetra-(2-naphthyloxy)-NcCSi(OCOCF$_3$)$_2$ |
| 190 | 2(3), 11(12), 20(21), 29(30) Tetra-(2-naphthylthio)-NcSi(OCOCH$_3$)$_2$ |
| 191 | 2(3), 11(12), 20(21), 29(30) Tetraallyloxy-Nc—Sn(OCOCH$_3$)$_2$ |
| 192 | 2(3), 11(12), 20(21), 29(30) Tetrapropargyloxy-NC—Si(OH)$_2$ |
| 193 | 2(3), 11(12), 20(21), 29(30) Tetracyclohexyloxy-NC—Si[OC$_6$H$_3$-3,5-diCO$_2$CH$_3$]$_2$ |
| 194 | 2(3), 11(12), 20(21), 29(30) Tetra(2-phenoxyethoxy)-Nc—AlOH |
| 195 | 2(3), 11(12), 20(21), 29(30) Tetra(2-phenylethoxy)-Nc—VO |
| 196 | 2(3), 11(12), 20(21), 29(30) Tetrabenzyloxy-Nc—InCl |
| 197 | 2(3), 11(12), 20(21), 29(30) Tetrapiperidino-Nc—Cu |
| 198 | 5,9,14,18,23,27,32,36-Octamethoxy-NcSi(OH)$_2$ |
| 199 | 5,9,14,18,23,27,32,36-Octa-n-butoxy-NcSi(OCCOCF$_3$)$_2$ |
| 200 | 5,9,14,18,23,27,32,36-Octaphenoxy-NcMg |
| 201 | 5,9,14,18,23,27,32,36-Octaallyloxy-NcAlOC$_6$H$_4$-4-CO$_2$CH$_3$ |
| 202 | 5,9,14,18,23,27,32,36-Octaethoxy-NcVO |
| 203 | 2(3), 11(12), 20(21), 29(30) - Tetrachloro-NcH$_2$ |
| 204 | 2(3), 11(12), 20(21), 29(30) - Tetrabromo-NcH$_2$ |
| 205 | 2,3,11,12,20,21,29,30-Octabromo-NcZn |
| 206 | 2,3,11,12,20,21,29,30-Octaphenoxy-NcAlOH |

TABLE 4-continued

NAPHTALOCYANINE COMPOUNDS
(Nc = NAPHTHALOCYANINE NUCLEUS)

| Ex. No. | COMPOUND |
|---|---|
| 207 | 2,3,11,12,20,21,29,30-Octaphenylthio-NcSi(OH)$_2$ |
| 208 | 2,3,11,12,20,21,29,30-Octabenzothiazol-2-ylthio-NcSi(OCOCF$_3$)$_2$ |
| 209 | 2,3,11,12,20,21,29,30-Octabenzoxazol-2-ylthio-NcVO |
| 210 | 2,3,11,12,20,21,29,30-Octatriazol-3-ylthio-NcCu |
| 211 | 2,3,11,12,20,21,29,30-Octa(4-t-butoxyphenoxy)NcAlOH |
| 212 | 2,3,11,12,20,21,29,30-Octa(4-methoxyphenylthio)NcSi(OH)$_2$ |
| 213 | 2,3,11,12,20,21,29,30-Octa(2-ethylhexoy)-NcSi(OH)$_2$ |
| 214 | 2,3,11,12,20,21,29,30-Octa(2-hydroxyethoxy)-NcAlCl |
| 215 | 2,3,11,12,20,21,29,30-Octa(2-hydroxyethylthio)-NcSi(OH)$_2$ |
| 216 | 2,3,11,12,20,21,29,30-Octa(4-hydroxybutylthio)-NcH$_2$ |
| 217 | 2,3,11,12,20,21,29,30-Octamethyl-NcAlOH |
| 218 | 2,3,11,12,20,21,29,30-Octa-p-t-butylphenylthio-Nc—Si(OH)$_2$ |
| 219 | 2(3), 11(12), 20(21), 29(30)-Tetra diethylamino-NcAlOH |
| 220 | 2(3), 11(12), 20(21), 29(30)-Tetra morpholino-NcAlOCOCF$_3$ |
| 221 | 2(3), 11(12), 20(21), 29(30)-Tetra-O(C$_2$H$_4$O)$_2$CH$_3$—Nc—Si(OH)$_2$ |
| 222 | 2(3), 11(12), 20(21), 29(30)-Tetra-O(C$_2$H$_4$O)$_2$CH$_3$—Nc—Si(OH)$_2$ |
| 223 | 2(3), 11(12), 20(21), 29(30)-tetra [(CH$_3$)$_3$—Si—CH$_2$S[—Nc—Si[OSi(C$_4$H$_9$)$_3$]$_2$ |
| 224 | 2(3), 11(12), 20(21), 29(30)-tetra [(C$_2$H$_5$)$_3$—Si—(CH$_2$)$_2$S]—Nc—Si[OSi(CH$_3$)$_3$]$_2$ |
| 225 | 2(3), 11(12), 20(21), 29(30)-tetra [(C$_6$H$_{13}$)$_3$—Si—CH$_2$—S]—Nc—Si[OSi(OCH$_3$)$_3$]$_2$ |
| 226 | 2(3), 11(12), 20(21), 29(30)-tetra [(CH$_3$O)$_3$—Si—(CH$_2$)$_3$—S]—Nc—Ge[OSi(C$_2$H$_5$)$_3$]$_2$ |
| 227 | 2(3), 11(12), 20(21), 29(30)-tetra [(C$_6$H$_5$O)$_3$—Si—CH$_2$—S]—Nc—Ge[OSi(OCH$_3$)$_3$]$_2$ |
| 228 | 2(3), 11(12), 20(21), 29(30)-tetra [(CH$_3$)$_3$—Si—CH$_2$CH$_2$—O]—Nc—Si(OH)$_2$] |
| 229 | 2(3), 11(12), 20(21), 29(30)-tetra [(CH$_3$)$_3$—SiC(Cl)$_2$CH$_2$S]—Nc—Ge[OSi(CH$_3$)$_3$]$_2$ |
| 230 | 2(3), 11(12), 20(21), 29(30)-tetra [(C$_6$H$_5$)$_3$—SiCH$_2$O]—Nc—Ge[(OCOCF$_3$)$_2$ |
| 231 | 2(3), 11(12), 20(21), 29(30)-tetra [(CH$_3$)$_3$—Si—CH$_2$S]—Nc—Sn[OSi(C$_2$H$_5$)$_3$]$_2$ |
| 232 | 2(3), 11(12), 20(21), 29(30)-tetra [(CH$_3$)$_3$—Si—CH$_2$S]—Nc—Sn[OC$_{18}$H$_{37}$)$_2$ |
| 233 | 2(3), 11(12), 20(21), 29(30)-tetra [(CH$_3$)$_2$C$_6$H$_5$Si—(CH$_2$)$_4$O]—Nc—AlOH |
| 234 | 2,3,11,12,20,21,29,30-octa [(CH$_3$)$_3$Si—CH$_2$S]—Nc—Si(OH)$_2$ |
| 235 | 5(36), 9(14), 18(23), 27(32)-tetraphenyl-Nc—AlOH |
| 236 | 5(36), 9(14), 18(23), 27(32)-tetraphenyl-NcAlOC$_6$H$_4$-4-CO$_2$CH$_3$ |
| 237 | 5(36), 9(14), 18(23), 27(32)-tetraphenyl-Si(OH)$_2$ |

We claim:

1. A coating composition comprising (I) about 20 weight percent to about 35 weight percent of a water-dissipatable polyester comprising:

(i) monomer residues of at least one dicarboxylic acid;

(ii) about 4 to 25 mole percent, based on the total of all acid, hydroxy and amino equivalents, of monomer residues of at least one difunctional sulfo monomer containing at least one sulfonate group bonded to an aromatic ring where the functional groups are hydroxy, carboxyl or amino;

(iii) monomer residues of at least one diol or a mixture of a diol and a diamine; and optionally, (iv) monomer residues of at least one difunctional monomer reactant selected from hydroxycarboxylic acids, aminocarboxylic acids and aminoalkanols;

provided that at least 20 percent of the groups linking the monomeric units are ester linkages; said water dissipatable polyester having from about 0.1 ppm by weight to about 10% by weight of a thermally stable near infrared flouorphoric compound copolymerized therein; and

(II) about 65 weight percent to about 80 weight percent of water.

2. The coating composition of claim 1, wherein component (iii) is comprised of

(a) at least 15 mole percent, based on the total mole percent of diol monomer residues or diol and diamine monomer residues, of a diol having the formula —(OCH$_2$CH$_2$)$_n$— where n is 2 to about 20, or (b) about 0.1 to less than about 15 mole percent, based on the total mole percent of diol monomer residues or diol and diamine monomer residues, of monomer residues of a poly(ethylene glycol) having the formula —(OCH$_2$CH$_2$)$_n$— where n is 2 to about 500, provided that the mole percent of such residues is inversely proportional to the value of n.

3. The coating composition of claim 1, wherein the near infrared flourescing compound is selected from the classes of phthalocyanines, 2,3-naphthalocyanines and squaraines and correspond to Formulae II, III and IV:

(II)

(III)

-continued wherein
Pc and Nc represent the phthalocyanine and 2,3-naphthalocyanine moieties of Formulae IIa and IIIa,

IIa

IIIa respectively, covalently bonded to hydrogen or to various metals, halometals, organometallic groups, and oxymetals selected from a group consisting of AlCl, AlBr, AlF, AlOH, AlOR$_5$, AlSR$_5$, Ca, Co, CrF, Fe, Ge, Ga, InCl, Mg, Mn, Ni, Pb, Pt, Pd, SiCl$_2$, SiF$_2$, SnCl$_2$, Sn(OR$_6$)$_2$, Si(OR$_6$)$_2$, Sn(SR$_6$)$_2$, Si(SR$_6$)$_2$, Sn, VO, TiO, or Zn,
wherein
R$_5$ and R$_6$ are selected from hydrogen, C$_1$-C$_{12}$ alkyl, phenyl, lower alkanoyl, trifluoroacetyl and groups of the formulae or R$_7$, R$_8$ and R$_9$ are independently selected from C$_1$-C$_{12}$ alkyl, phenyl or phenyl substituted with lower alkyl, lower alkoxy or halogen;

X is selected from oxygen, sulfur, selenium, tellurium or a group of the formula —N-R$_{10}$, wherein R$_{10}$ is hydrogen, C$_3$-C$_8$ cycloalkyl, C$_1$-C$_{12}$ alkyl, C$_1$-C$_{10}$ acyl, C$_1$-C$_{12}$ alkylsulfonyl, or phenyl or R$_{10}$ and R taken together form an aliphatic or aromatic ring with the nitrogen atom to which they are attached;

Y is selected from C$_1$-C$_{12}$ alkyl, phenyl, halogen and hydrogen;

R is selected from unsubstituted or substituted C$_1$-C$_{12}$ alkyl, alkenyl, or C$_3$-C$_8$ cycloalkyl, phenyl, heteroaryl,

$$\text{alkylene}-\underset{\underset{R_8}{|}}{\overset{\overset{R_7}{|}}{Si}}-R$$

$$\text{alkylene}-\underset{\underset{OR_9}{|}}{\overset{\overset{OR_7}{|}}{Si}}-OR_8; \text{ or}$$

—(X-R)$_m$ is alkylsulfonylamino, arylsulfonylamino, or a group selected from the formulae —X(C$_2$H$_4$O)$_z$R$^1$, and wherein
R$^1$ is hydrogen or R as defined above; Z is an integer of from 1-4;
or two —(X-R)$_m$ groups taken together to form divalent substituents of the formula wherein
each $X^1$ is independently selected from —O—, —S—, and —N-$R_{10}$ and A is selected from ethylene; propylene; trimethylene; and said groups substituted with $C_1$-$C_4$ alkyl, $C_1$-$C_4$ alkoxy, aryl and cycloalkyl; 1,2-phenylene and 1,2-phenylene containing 1-3 substituents selected from $C_1$-$C_4$ alkyl, $C_1$-$C_4$ alkoxy and halogen;

$R_1$ and $R_2$ are independently selected from hydrogen, lower alkyl, lower alkoxy, halogen, aryloxy, lower alkylthio, arylthio, lower alkylsulfonyl; arylsulfonyl; lower alkylsulfonylamino, arylsulfonylamino, cycloalkylsulfonylamino, carboxy, unsubstituted and substituted carbamoyl and sulfamoyl, lower alkoxycarbonyl, hydroxy, lower alkanoyloxy, and $R_3$ and $R_4$ are independently selected from hydrogen, lower alkyl, alkenyl or phenyl; n is an integer from 0-12; $n_1$ is an integer from 0-24, m is an integer from 4-16; $m_1$ is an integer from 0-16; provided that the sums of n+m and $n_1$+$m_1$ are 16 and 24, respectively, provided that at least one polyester reactive group is present.

4. The coating composition of claim 1, wherein the near infrared fluorescing compound is a squaraine compound of Formula IV, wherein $R_1$ and $R_2$ are independently carboxy or lower alkoxycarbonyl.

5. The coating composition of claim 1, wherein the near infrared fluorescing compound is a 2,3-naphthalocyanine compound of Formula III, wherein Y is hydrogen, $n_1$ is 24, and m, is 0.

6. The coating composition of claim 1, wherein the near infrared fluorescing compound is a 2,3-naphthalocyanine compound of Formula III, wherein the naphthalocyanine moiety is bonded to $SiCl_2$, $Si(OH)_2$, or $Si(OR_6)_2$.

7. The coating composition of claim 1, wherein the near infrared fluorescing compound is a phthalocyanine compound of Formula II, wherein X is oxygen, R is aryl, Y is hydrogen, m is 4, and n is 12; and wherein the phthalocyanine moiety is bonded to AlCl, AlOH, AlOCOCF$_3$, AlOR$_5$, SiCl$_2$, Si(OH)$_2$, or Si(OR$_6$)$_2$.

* * * * *